United States Patent
Park

(10) Patent No.: US 9,338,252 B2
(45) Date of Patent: May 10, 2016

(54) METHOD AND APPARATUS FOR MAINTAINING IP CONNECTION

(75) Inventor: Yong-Seok Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 570 days.

(21) Appl. No.: 13/599,103

(22) Filed: Aug. 30, 2012

(65) Prior Publication Data

US 2013/0060927 A1 Mar. 7, 2013

(30) Foreign Application Priority Data

Sep. 1, 2011 (KR) ........................ 10-2011-0088728

(51) Int. Cl.
*G06F 15/16* (2006.01)
*H04L 29/08* (2006.01)

(52) U.S. Cl.
CPC ............ *H04L 67/322* (2013.01); *H04L 67/145* (2013.01); *H04L 67/26* (2013.01)

(58) Field of Classification Search
USPC .................................. 709/220–223, 227–228
See application file for complete search history.

(56) References Cited

U.S. PATENT DOCUMENTS

| | | | |
|---|---|---|---|
| 7,774,007 B2 | 8/2010 | Backholm et al. | |
| 8,417,823 B2 * | 4/2013 | Luna et al. | 709/227 |
| 8,484,370 B1 * | 7/2013 | Coffee et al. | 709/232 |
| 2008/0144613 A1 * | 6/2008 | Adhikari et al. | 370/389 |
| 2012/0131184 A1 * | 5/2012 | Luna et al. | 709/224 |
| 2012/0221700 A1 * | 8/2012 | Dutta et al. | 709/223 |

* cited by examiner

*Primary Examiner* — Abdullahi E Salad
(74) *Attorney, Agent, or Firm* — Jefferson IP Law, LLP

(57) ABSTRACT

An apparatus and method for maintaining an Internet Protocol (IP) connection in a portable terminal is provided. The method includes when there is a request for registration of a service or an application having a push function, determining whether a first service quality interval corresponding to the service or application, registration of which has been requested, has been stored in the memory, and periodically transmitting a keep-alive message for maintaining the IP connection by using the first service quality interval when the first service quality interval has been stored in the memory.

13 Claims, 4 Drawing Sheets

METHOD AND APPARATUS FOR MAINTAINING IP CONNECTION

PRIORITY

This application claims the benefit under 35 U.S.C. §119(a) of a Korean patent application filed on Sep. 1, 2011 in the Korean Intellectual Property Office and assigned Serial No. 10-2011-0088728, the entire disclosure of which is hereby incorporated by reference.

BACKGROUND OF THE INVENTION

1. Field of the Invention

The present invention relates to a portable terminal. More particularly, the present invention relates to a method and an apparatus for maintaining an Internet Protocol (IP) connection in a portable terminal.

2. Description of the Related Art

In general, a portable terminal transmits a keep-alive message according to either a fixed period or a period determined by a period determining algorithm. For example, when a fixed period is 10 minutes, a portable terminal may transmit a keep-alive message to a server at every 10 minutes.

A scheme of transmitting a keep-alive message according to a fixed period or a scheme of transmitting a keep-alive message by using a period determining algorithm as described above is proper for a case in which an application or a service having a push function receives data in real time.

However, when an application or a service having a push function need not receive data in real time, use of such schemes for transmission of a keep-alive message may cause unnecessarily too frequent transmission of the keep-alive message, which results in a waste of resources for transmission of the keep-alive message.

Further, such frequent transmission of the keep-alive message may cause rapid battery consumption and increase the cost for data packet transmission. Therefore, there is a need for addressing this problem.

Therefore, a need exists for a system and method for performing a self diagnosis of a device without the inconvenience caused when manually selecting a self diagnosis item from a computer or a user interface.

SUMMARY OF THE INVENTION

Aspects of the present invention are to address at least the above-mentioned problems and or disadvantages and to provide at least the advantages described below. Accordingly, an aspect of the present invention is to provide an apparatus and a method for determining a period for transmitting a keep-alive message according to a service or an application for which a push function has been registered.

Another aspect of the present invention is to provide an apparatus and a method for determining a period for transmitting a keep-alive message according to a service quality interval of a service or an application for which a push function has been registered.

In accordance with an aspect of the present invention, an apparatus for maintaining an Internet Protocol (IP) connection in a portable terminal is provided, The apparatus includes a memory storing a service quality interval corresponding to one of multiple services and applications having a push function, and a controller, when there is a request for registration of a service or an application having the push function, determining whether a first service quality interval corresponding to the service or application, registration of which has been requested, has been stored in the memory, and periodically transmitting a keep-alive message for maintaining the IP connection by using the first service quality interval when the first service quality interval has been stored in the memory.

In accordance with another aspect of the present invention, there is provided a method for maintaining an Internet Protocol (IP) connection in a portable terminal, the method including: when there is a request for registration of a service or an application having a push function, determining whether a first service quality interval corresponding to the service or application, registration of which has been requested, has been stored in the memory; and periodically transmitting a keep-alive message for maintaining the IP connection by using the first service quality interval when the first service quality interval has been stored in the memory.

The techniques disclosed herein enable a period for transmitting a keep-alive message to be determined according to a service or an application for which a push function has been registered.

Also, the techniques disclosed herein enable a period for transmitting a keep-alive message to be determined according to a service quality interval of a service or an application for which a push function has been registered.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A portable terminal according to an exemplary embodiment of the present invention refers to an electronic device which is mobile and can be easily carried, and may be a video phone, a portable phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an Electronic-Book (E-Book), a portable computer (such as a Notebook, a Tablet Personal Computer (PC), etc.), or a Digital Camera.

Further, it is assumed that an application or a service according to an exemplary embodiment of the present invention has a push function. As used herein, the push function refers to a function of notifying a user of reception of data corresponding to a relevant application or service when the data has been received.

Figure 1:
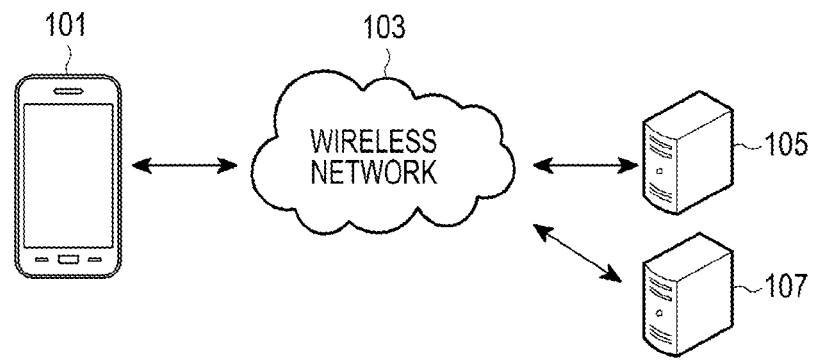
FIG. 1 is a block diagram of a system according to an exemplary embodiment of the present invention.

FIG. 1 is a block diagram of a system according to an exemplary embodiment of the present invention.

Referring to FIG. 1, the system according to an exemplary embodiment of the present invention includes a portable terminal 101, a wireless network 103, a first server 105, and a second server 107.

Each element of the system will be discussed now in more detail. The wireless network 103 allows transmission/reception of data between the portable terminal 101 and the first and second servers 105 and 107.

The wireless network 103 receives a request for registration of a service or an application from the portable terminal 101 and transmits the received registration request to a server related to the service or application among the first and second servers 105 and 107. Further, the wireless network 103 receives an interval of a service quality (e.g., Quality of Service; hereinafter, "(QoS)) corresponding to a service or an application, registration of which has been requested for by one server among the first and second servers 105 and 107, and transmits the received QoS interval to the portable terminal 101.

As used herein, the QoS interval refers to an interval, by which an Internet Protocol (IP) connection should be maintained in order to satisfy the quality of a service or an application, and has been appointed in advance in a server.

Further, the service or application has a push function. For example, the service or application may be a KAKAOTALK application which transmits/receives a text message and displays a text message on a screen of the portable terminal 101 when the text message has been received. Further, the service may be a firmware update notification service which notifies that firmware of the portable terminal 101 should be updated.

Further, the first or second server 105 or 107 transmits or receives data, which is related to a service or an application that can be registered in a portable terminal and is for providing the service or application to the portable terminal, to or from the portable terminal 101.

Upon receiving a request for registration of a service or an application from the portable terminal 101, the first or second server 105 or 107 registers the service or application. Further, the first or second server 105 or 107 detects a pre-appointed QoS interval corresponding to the registered service or application and transmits the detected QoS interval to the portable terminal 101 through the wireless network 103.

In addition, when a pre-appointed condition or a condition requested by a user is satisfied, the portable terminal 101 provides a corresponding application or service to the user.

More particularly, the portable terminal 101 transmits a registration request for registration of an application or a service in a server to one server among the first and second servers 105 or 107 through the wireless network 103 and receives a QoS interval corresponding to the application or service through the wireless network 103 from the server having received the registration request. Moreover, the portable terminal 101 periodically transmits a keep-alive message by using the received QoS interval.

As used herein, the keep-alive message refers to a message for maintaining the IP connection.

Figure 2:
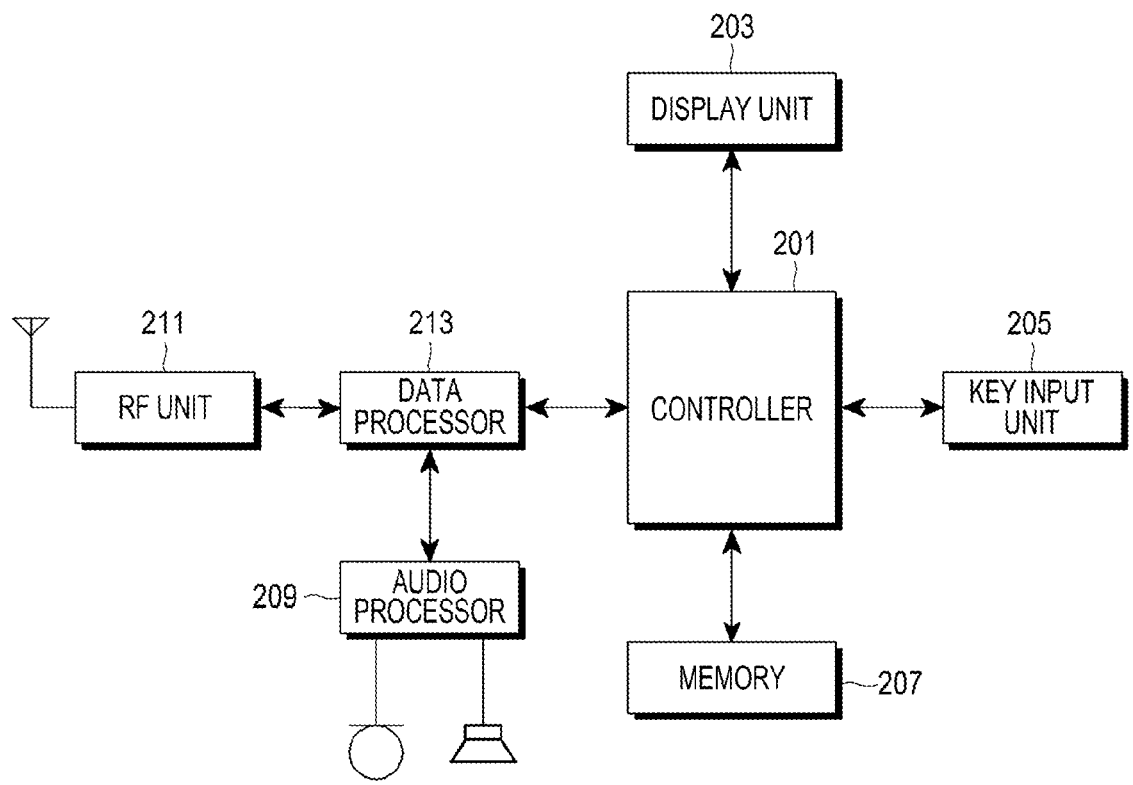
FIG. 2 is a block diagram of a portable terminal according to an exemplary embodiment of the present invention.

FIG. 2 is a block diagram of a portable terminal according to an exemplary embodiment of the present invention.

Referring to FIG. 2, the portable terminal includes a controller 201, a display unit 203, a key input unit 205, a memory 207, an audio processor 209, a Radio Frequency (RF) unit 211, and a data processor 213.

Each element of the portable terminal will be discussed now in more detail. The RF unit 211 performs a wireless communication function of the portable terminal. Specifically, the RF unit 211 includes a wireless transmitter for up-converting and amplifying the frequency of a transmitted signal and a wireless receiver for low-noise-amplifying a received signal and down-converting the frequency of the received signal. Further, the data processor 213 includes a transmitter for encoding and modulating an outgoing signal and a receiver for demodulating and decoding an incoming signal. Herein, the data processor 213 may include a modem or a codec, wherein the codec may include a data codec for processing packet data, etc., and an audio codec for processing an audio signal, such as a voice signal.

In addition, the audio processor 209 may reproduce an incoming audio signal output from the data processor 213 through a speaker or transmit an outgoing audio signal generated by a microphone to the data processor 213. Further, the key input unit 205 includes keys for input of number and character information and function keys for setting various functions, and the display unit 203 displays an image signal on a screen and displays data output by the control of the controller 201.

If the display unit 203 is realized by a touch screen of a capacitive type or a resistive type, the key input unit 205 may include only a predetermined minimum set of keys and the display unit 203 may cover for a part of the key input function of the key input unit 205.

Further, the memory 207 includes a program memory and a data memory. The program memory stores an Operating System (OS) for booting and controlling general operations of the portable terminal, and the data memory stores various data occurring during the operations of the portable terminal. Especially, the memory 207 stores in advance a QoS interval corresponding to a plurality of services or applications and stores a QoS interval received from the server in accordance with a relevant application or service.

Further, the controller 201 controls the general operations of the portable terminal. The controller 201 sets a keep-alive interval, which indicates an interval for transmission of the keep-alive message, according to the type of the service or application registered in the portable terminal, and transmits a keep-alive message according to the set keep-alive interval.

In more detail, if there is a request for de-registration of a service or an application from a user, the controller 201 de-registers the service or application and selects a minimum QoS interval among one or more QoS intervals of the currently registered application or service. In this event, the controller 201 detects at least one QoS interval, which is larger than a minimum QoS reference interval, among the one or more QoS intervals of the currently registered application or service, and then selects a minimum QoS interval from the detected at least one QoS interval, wherein the minimum QoS reference interval may have a pre-appointed value, for example, 30 minutes or one hour.

Further, the controller 201 compares the selected minimum QoS interval with a minimum reference value. The minimum reference value is determined based on a pre-appointed maximum time interval (e.g., keep-alive max interval) for transmission of a keep-alive message and may be set as, for example, 30 minutes or one hour.

As a result of the comparison, when the minimum QoS interval is smaller than or equal to the minimum reference value, the controller 201 determines the currently registered application or service as an application or service requiring real time reception of data, and then transmits a keep-alive message at a minimum transmission interval, wherein the minimum transmission interval is appointed in advance and may be, for example, five minutes.

In contrast, when the minimum QoS interval is larger than the minimum reference value, the controller 201 compares the minimum QoS interval with a maximum reference value. The maximum reference value corresponds to a value appointed in advance and may be set as, for example, 6 hours or 8 hours.

As a result of the comparison, when the minimum QoS interval is smaller than or equal to the maximum reference value, the controller 201 sets the minimum QoS interval as the keep-alive interval and transmits the keep-alive message according to the set keep-alive interval. As used herein, the keep-alive interval refers to an interval by which the controller 201 transmits the keep-alive message. In contrast, when the minimum QoS interval is larger than the maximum reference value, the controller 201 cancels the IP connection.

Also, when there is a request for registration of a service or an application from a user, the controller 201 transmits a registration request signal of the service or application to a corresponding server and receives a registration confirmation signal indicating that the registration-requested service or application has been registered, as a response to the registration request signal. Further, the controller 201 determines whether a QoS interval of the registration-requested service or application has been stored in the memory 207.

When the QoS interval has been stored in the memory 207, the controller 201 selects a minimum QoS interval among the stored QoS interval and one or more QoS intervals of the currently registered application or service. In this event, the controller 201 detects at least one QoS interval, which is larger than a minimum QoS reference interval, among the stored QoS interval and the one or more QoS intervals of the currently registered application or service, and then selects a minimum QoS interval from the detected at least one QoS interval.

Then, the controller 201 compares the selected minimum QoS interval with a minimum reference value.

As a result of the comparison, when the minimum QoS interval is smaller than or equal to the minimum reference value, the controller 201 determines the currently registered application or service as an application or service requiring real time reception of data, and then transmits a keep-alive message at a minimum transmission interval.

In contrast, when the minimum QoS interval is larger than the minimum reference value, the controller 201 compares the minimum QoS interval with a maximum reference value.

As a result of the comparison, when the minimum QoS interval is smaller than or equal to the maximum reference value, the controller 201 sets the minimum QoS interval as the keep-alive interval and transmits the keep-alive message according to the set keep-alive interval. In contrast, when the minimum QoS interval is larger than the maximum reference value, the controller 201 cancels the IP connection.

When a QoS interval has not been stored in the memory 207, the controller 201 transmits a QoS interval request signal of the registration-requested application or service to a relevant server and receives a QoS interval corresponding to the registration-requested application or service from the relevant server as a response to the transmitted QoS interval request signal.

Further, the controller 201 selects a minimum QoS interval among the received QoS interval and one or more QoS intervals of the currently registered application or service. In this event, the controller 201 detects at least one QoS interval, which is larger than a minimum QoS reference interval, among the received QoS interval and the one or more QoS intervals of the currently registered application or service, and then selects a minimum QoS interval from the detected at least one QoS interval.

Then, the controller 201 compares the selected minimum QoS interval with a minimum reference value.

As a result of the comparison, when the minimum QoS interval is smaller than or equal to the minimum reference value, the controller 201 determines the currently registered application or service as an application or service requiring real time reception of data, and then transmits a keep-alive message at a minimum transmission interval.

In contrast, when the minimum QoS interval is larger than the minimum reference value, the controller 201 compares the minimum QoS interval with a maximum reference value.

As a result of the comparison, when the minimum QoS interval is smaller than or equal to the maximum reference value, the controller 201 sets the minimum QoS interval as the keep-alive interval and transmits the keep-alive message according to the set keep-alive interval. In contrast, when the minimum QoS interval is larger than the maximum reference value, the controller 201 cancels the IP connection.

Figure 3:
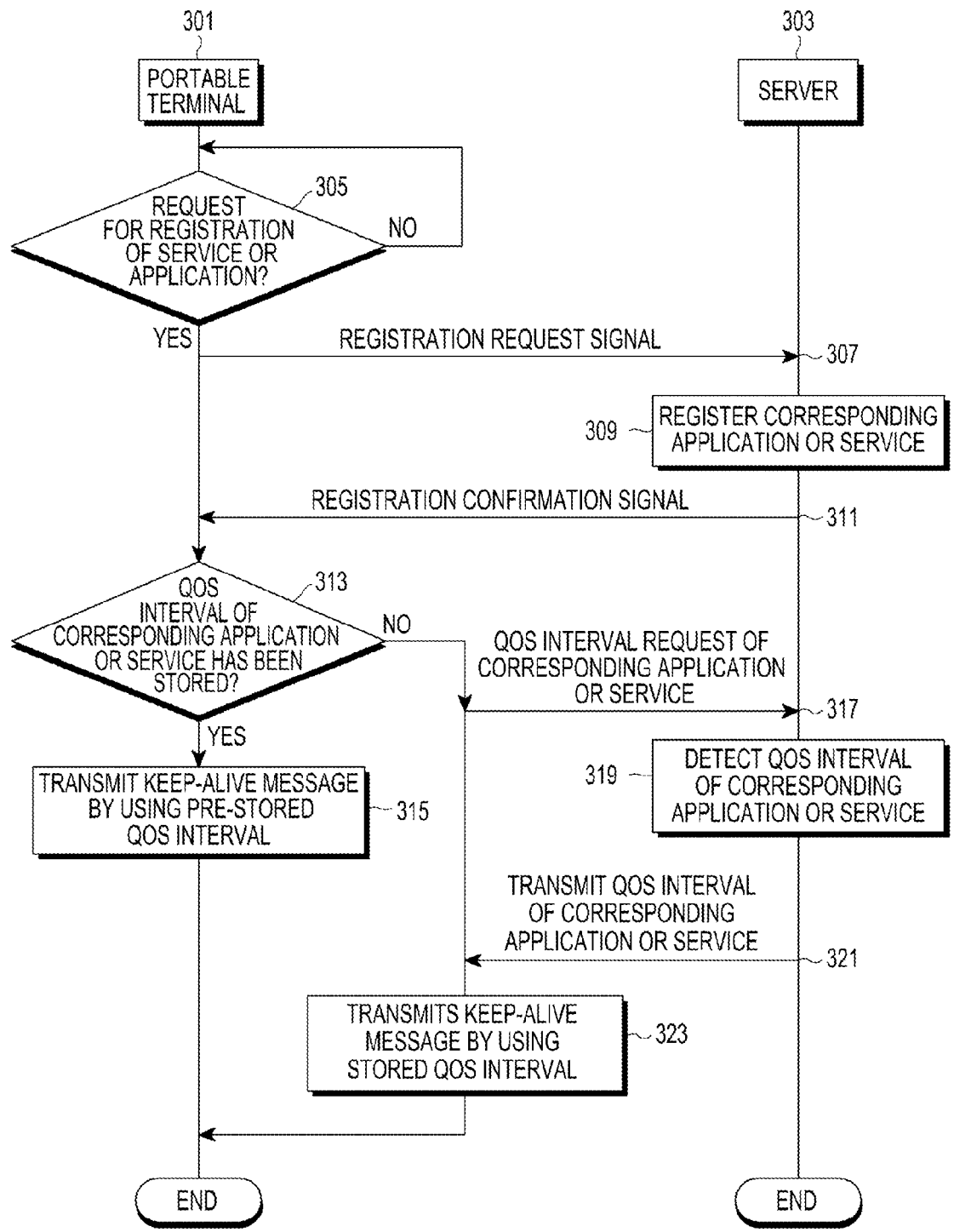
FIG. 3 is a flowchart of a process for transmitting a keep-alive message in a wireless network according to an exemplary embodiment of the present invention.

FIG. 3 is a flowchart of a process for transmitting a keep-alive message in a wireless network according to an exemplary embodiment of the present invention.

Referring to FIG. 3, in step 305, a portable terminal 301 determines if there is a request for registration of a service or an application from a user. When there is a request for registration of a service or an application, the portable terminal 301 proceeds to step 307. Otherwise, the portable terminal 301 returns to step 305.

In step 307, the portable terminal 301 transmits a registration request signal of the registration-requested application or service to a server 303, and then proceeds to step 309.

Then, the server 303 registers the registration-requested application or service in step 309, and then proceeds to step 311. In step 311, the server 303 transmits a registration confirmation signal, which indicates the registration of the application or service, to the portable terminal 301, and then proceeds to step 313.

Then, in step 313, the portable terminal 301 determines whether a QoS interval of the registered application or service has been stored. When the QoS interval has been stored, the portable terminal 301 proceeds to step 315. Otherwise, the portable terminal 301 proceeds to step 317.

In step 315, the portable terminal 301 transmits a keep-alive message by using the pre-stored QoS interval. For example, the portable terminal 301 sets a keep-alive interval by using the pre-stored QoS interval and then transmits the keep-alive message according to the set keep-alive interval. In step 317, the portable terminal 301 transmits a QoS interval request of the application or service to the server 303 and then proceeds to step 319.

Upon receiving the QoS interval request, the server 303 detects a QoS interval of the application or service in step 319, and then proceeds to step 321. In step 321, the server 303 transmits the QoS interval of the application or service to the portable terminal 301, and then proceeds to step 323.

In step 323, the portable terminal 301 receives the QoS interval, stores the received QoS interval in accordance with the application or service, and then transmits a keep-alive message by using the stored QoS interval. For example, the portable terminal 301 sets a keep-alive interval by using a pre-stored QoS interval and transmits a keep-alive message according to the set keep-alive interval.

Figure 4:
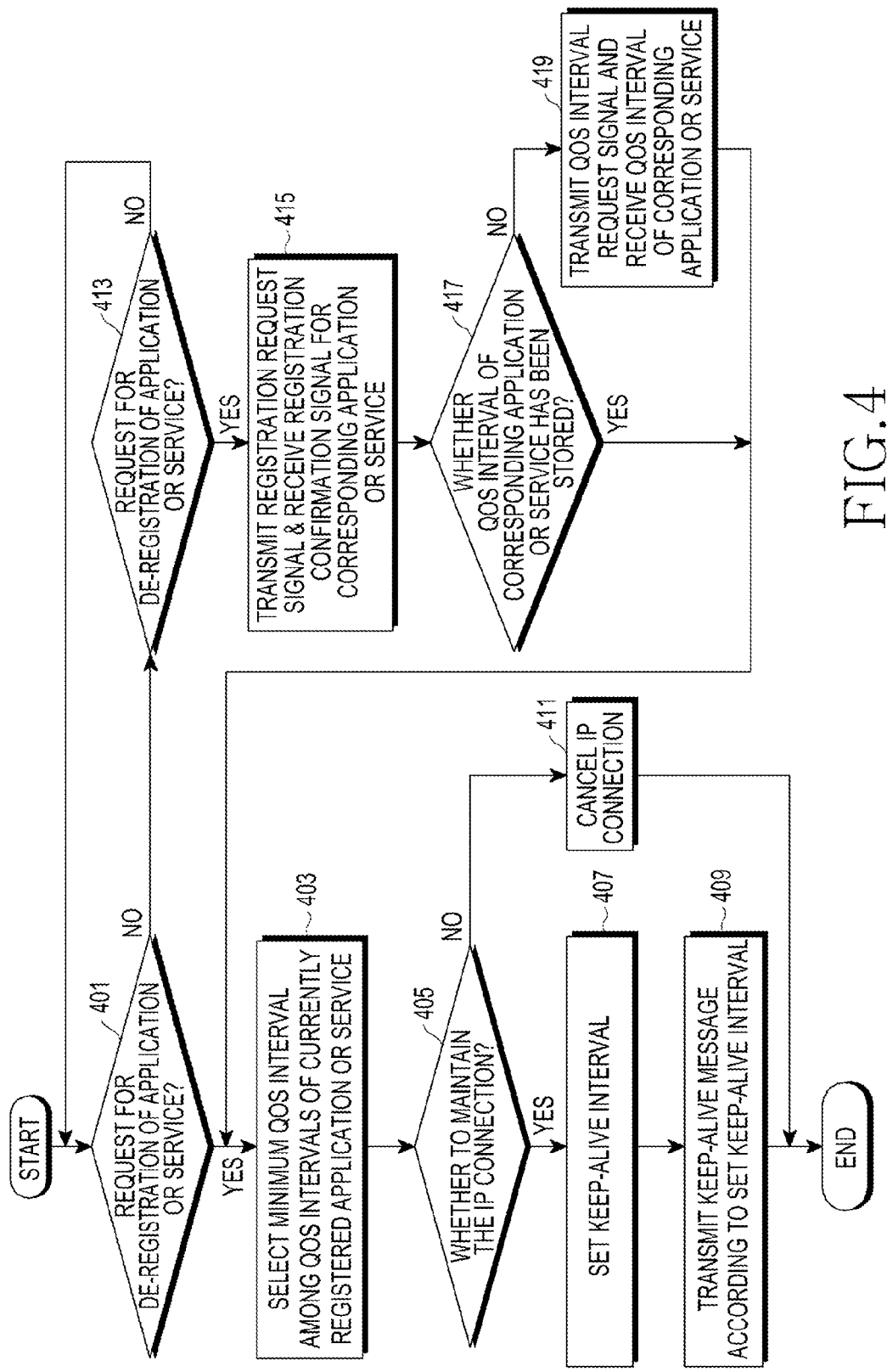
FIG. 4 is a flowchart of a process for transmitting a keep-alive message by a portable terminal according to an exemplary embodiment of the present invention.

FIG. 4 is a flowchart of a process for transmitting a keep-alive message by a portable terminal according to an exemplary embodiment of the present invention.

Referring to FIG. 4, in step 401, a portable terminal determines if there is a request for de-registration of an application or a service from a user. When there is a request for de-registration, the portable terminal proceeds to step 403. Otherwise, the portable terminal proceeds to step 413.

In step 413, the portable terminal determines if there is a request for registration of an application or a service from a user. As a result of the determination, when there is a request for registration, the portable terminal proceeds to step 415. Otherwise, the portable terminal returns to step 401.

In step 415, the portable terminal 301 transmits a registration request signal for the application or service to the server and receives a registration confirmation signal, which indicates that the application or service has been registered, as a response to the registration request signal, and then proceeds to step 417.

In step 417, the portable terminal determines whether a QoS interval of the application or service has been stored. As a result of the determination, when a QoS interval has been stored, the portable terminal proceeds to step 403. When a QoS interval has not been stored, the portable terminal proceeds to step 419.

In step 419, the portable terminal transmits a QoS interval request signal of the application or service to the server and receives a QoS interval, as a response to the QoS interval request signal, from the server, and then proceeds to step 403.

In step 403, the portable terminal selects a minimum QoS interval among one or more QoS intervals of the currently registered application or service, and then proceeds to step 405. In this event, the controller 201 detects at least one QoS interval, which is larger than a minimum QoS reference interval, among the one or more QoS intervals of the currently registered application or service, and then selects a minimum QoS interval from the detected at least one QoS interval, wherein the minimum QoS reference interval may have a pre-appointed value, for example, 30 minutes or one hour.

Further, in step 405, using the selected minimum QoS interval, the portable terminal determines whether to maintain the IP connection. When it is determined to maintain the IP connection, the portable terminal proceeds to step 407. In contrast, when it is determined not to maintain the IP connection, the portable terminal proceeds to step 411.

In more detail, the portable terminal compares the minimum QoS interval with a minimum reference value. The minimum reference value is determined based on a pre-appointed maximum time interval (e.g., keep-alive max interval) for transmission of a keep-alive message and may be set as, for example, 30 minutes or one hour. As a result of the comparison, when the minimum QoS interval is smaller than or equal to the minimum reference value, the portable terminal proceeds to step 407.

In contrast, when the minimum QoS interval is larger than the minimum reference value, the controller 201 compares the minimum QoS interval with a maximum reference value. The maximum reference value corresponds to a value appointed in advance and may be set as, for example, 6 hours or 8 hours.

As a result of the comparison, when the minimum QoS interval is smaller than or equal to the maximum reference value, the portable terminal proceeds to step 407. In contrast, when the minimum QoS interval is larger than the maximum reference value, the portable terminal proceeds to step 411.

In step 407, when the minimum QoS interval is smaller than or equal to the minimum reference value, the portable terminal determines the currently registered application or service as an application or a service requiring real time data reception and sets a minimum transmission interval as the keep-alive interval, and then proceeds to step 409. As used herein, the keep-alive interval refers to an interval by which the portable terminal transmits the keep-alive message and may be, for example, five minutes.

Further when the minimum QoS interval is larger than the minimum reference value and is smaller than or equal to the maximum reference value, the portable terminal sets the minimum QoS interval as the keep-alive interval, and then proceeds to step 409.

Then, in step 409, the portable terminal transmits the keep-alive message according to the set keep-alive interval. In step 411, the portable terminal determines that it is not necessary to maintain the IP connection of the currently registered application or service, and cancels the IP connection.

Figure 5:
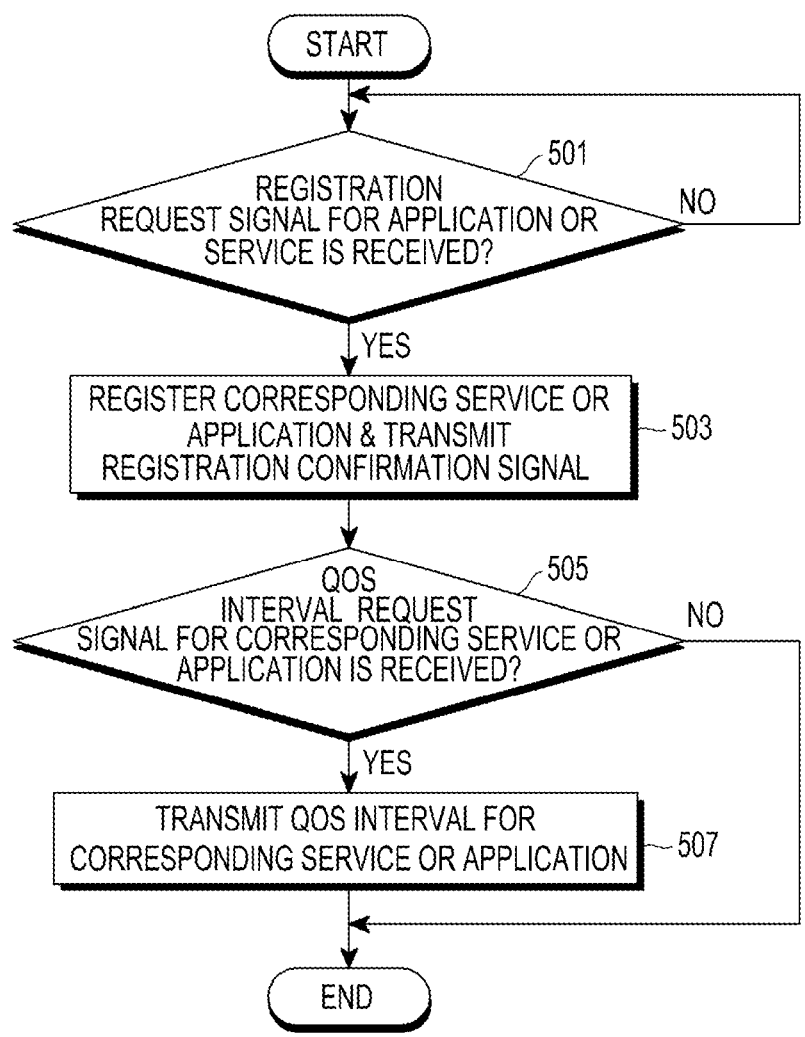
FIG. 5 is a flowchart of a process for transmitting a Quality of Service (QoS) interval by a server according to an exemplary embodiment of the present invention.

FIG. 5 is a flowchart of a process for transmitting a QoS interval by a server according to an exemplary embodiment of the present invention.

Referring to FIG. 5, in step 501, the server determines if a registration request signal for requesting registration of an application or a service is received from a portable terminal. When a registration request signal has been received, the server proceeds to step 503. Otherwise, the server repeatedly performs step 501.

In step 503, the server registers the registration-requested service or application and transmits a registration confirmation signal, indicating that the registration-requested service or application has been registered, to the portable terminal, and then proceeds to step 505. In step 505, the server determines whether a QoS interval request signal, which requests a QoS interval of the registration-requested application or service, is received from the portable terminal. When a QoS interval request signal is received, the server proceeds to step 507. Otherwise, the server terminates the QoS interval transmitting process.

In step 507, the server detects the QoS interval of the registration-requested service or application and transmits the detected QoS interval to the portable terminal.

Through the above process, the techniques described herein enable a period for transmitting a keep-alive message to be determined according to a service or an application for which a push function has been registered. Also, the techniques described herein enable a period for transmitting a keep-alive message to be determined according to a service quality interval of a service or an application for which a push function has been registered.

Exemplary embodiments of the present invention according to the claims and description in the specification can be realized in the form of hardware, or a combination of hardware and software.

Such software may be stored in a non-transitory computer readable storage medium. The non-transitory computer readable storage medium stores one or more programs (e.g., software modules), the one or more programs comprising instructions, which when executed by one or more processors in an electronic device, cause the electronic device to perform methods of the exemplary embodiments of the present invention.

Such software may be stored in the form of volatile or non-volatile storage such as, for example, a storage device like a Read-Only Memory (ROM), whether erasable or rewritable or not, or in the form of memory such as, for example, Random-Access Memory (RAM), memory chips, device or integrated circuits or on an optically or magnetically readable medium such as, for example, a Compact Disc (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Exemplary embodiments provide a program comprising code for implementing apparatus or a method as claimed in any one of the claims of this disclosure and a machine-readable storage storing such a program. Still further, such programs may be conveyed electronically via any medium such as a communication signal carried over a wired or wireless connection and exemplary embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims.

For example, in exemplary embodiments of the present invention, a portable terminal receives a QoS interval corresponding to a registration-requested application or service from a server and periodically transmits a keep-alive message by using the received QoS interval. However, when the portable terminal is unable to receive a QoS interval from the server, the portable terminal may transmit a keep-alive message according to a period, which has been determined according to a period determining algorithm or determined in advance in order to transmit the keep-alive message.

What is claimed is:

1. An apparatus for maintaining an Internet Protocol (IP) connection in a portable terminal, the apparatus comprising:
a memory storing a service quality interval corresponding to one of multiple services and applications having a push function; and
a controller, when there is a request for registration of a service or an application having the push function, determining whether a first service quality interval corresponding to the service or application, registration of which has been requested, has been stored in the memory, and periodically transmitting a keep-alive message for maintaining the IP connection by using the first service quality interval when the first service quality interval has been stored in the memory,
wherein, as a result of a comparison, when the first service quality interval has not been stored in the memory, the controller transmits a service quality request signal, which requests a service quality interval corresponding to the service or application, registration of which has been requested, to a server, receives a second service quality interval, as a response to the service quality request signal, from the server, and periodically transmits the keep-alive message by using the second service quality interval, and
wherein the controller selects a minimum service quality interval among service quality intervals corresponding to the currently registered application or service and the first service quality interval, and periodically transmits the keep-alive message according to the selected minimum service quality interval when the selected minimum service quality interval is larger than a pre-appointed minimum reference value and is smaller than or equal to a pre-appointed maximum reference value.

2. The apparatus of claim 1, wherein, when there is a request for de-registration of the service or application having the push function, the controller periodically transmits the keep-alive message by using at least one service quality interval corresponding to at least one currently registered application or service except for the service or application, registration of which has been requested.

3. The apparatus of claim 1, wherein the controller sets a keep-alive interval, which indicates an interval for transmission of the keep-alive message, by using the first service quality interval, and transmits the keep-alive message according to the set keep-alive interval.

4. The apparatus of claim 1, wherein the first service quality interval indicates an IP connection interval which satisfies a service quality of the service or application, registration of which has been requested.

5. The apparatus of claim 1, wherein, when the selected minimum service quality interval is smaller than or equal to the minimum reference value, the controller periodically transmits the keep-alive message according to a minimum transmission interval pre-appointed in order to maintain the IP connection.

6. The apparatus of claim 1, wherein, when the selected minimum service quality interval is larger than the maximum reference value, the controller cancels the IP connection.

7. A method for maintaining an Internet Protocol (IP) connection in a portable terminal, the method comprising:
when there is a request for registration of a service or an application having a push function, determining whether a first service quality interval corresponding to the service or application, registration of which has been requested, has been stored in the memory;
periodically transmitting a keep-alive message for maintaining the IP connection by using the first service quality interval when the first service quality interval has been stored in the memory;
as a result of a comparison, when the first service quality interval has not been stored in the memory, transmitting a service quality request signal, which requests a service quality interval corresponding to the service or application, registration of which has been requested, to a server;

receiving a second service quality interval, as a response to the service quality request signal, from the server; and periodically transmitting the keep-alive message by using the second service quality interval, wherein the periodically transmitting of the keep-alive message comprises:

selecting a minimum service quality interval among service quality intervals corresponding to the currently registered application or service and the first service quality interval, and periodically transmitting the keep-alive message according to the selected minimum service quality interval when the selected minimum service quality interval is larger than a pre-appointed minimum reference value and is smaller than or equal to a pre-appointed maximum reference value.

8. The method of claim 7, further comprising:

when there is a request for de-registration of the service or application having the push function, periodically transmitting the keep-alive message by using at least one service quality interval corresponding to at least one currently registered application or service except for the service or application, registration of which has been requested.

9. The method of claim 7, wherein the periodically transmitting of the keep-alive message comprises:

setting a keep-alive interval, which indicates an interval for transmission of the keep-alive message, by using the first service quality interval; and transmitting the keep-alive message according to the set keep-alive interval.

10. The method of claim 7, wherein the first service quality interval indicates an IP connection interval which satisfies a service quality of the service or application, registration of which has been requested.

11. The method of claim 7, further comprising:

when the selected minimum service quality interval is smaller than or equal to the minimum reference value, periodically transmitting the keep-alive message according to a minimum transmission interval pre-appointed in order to maintain the IP connection.

12. The method of claim 7, further comprising:

when the selected minimum service quality interval is larger than the maximum reference value, canceling the IP connection.

13. A non-transitory computer readable recording medium having recorded thereon a computer program, that when executed by one or more processors, cause the one or more processors to control a portable terminal to perform operations, the operations comprising:

when there is a request for registration of a service or an application having a push function, determining whether a first service quality interval corresponding to the service or application, registration of which has been requested, has been stored in the memory;

periodically transmitting a keep-alive message for maintaining the IP connection by using the first service quality interval when the first service quality interval has been stored in the memory;

as a result of a comparison, when the first service quality interval has not been stored in the memory, transmitting a service quality request signal, which requests a service quality interval corresponding to the service or application, registration of which has been requested, to a server;

receiving a second service quality interval, as a response to the service quality request signal, from the server; and periodically transmitting the keep-alive message by using the second service quality interval, wherein the periodically transmitting of the keep-alive message comprises:

selecting a minimum service quality interval among service quality intervals corresponding to the currently registered application or service and the first service quality interval, and periodically transmitting the keep-alive message according to the selected minimum service quality interval when the selected minimum service quality interval is larger than a pre-appointed minimum reference value and is smaller than or equal to a pre-appointed maximum reference value.

* * * * *